Patented July 12, 1932

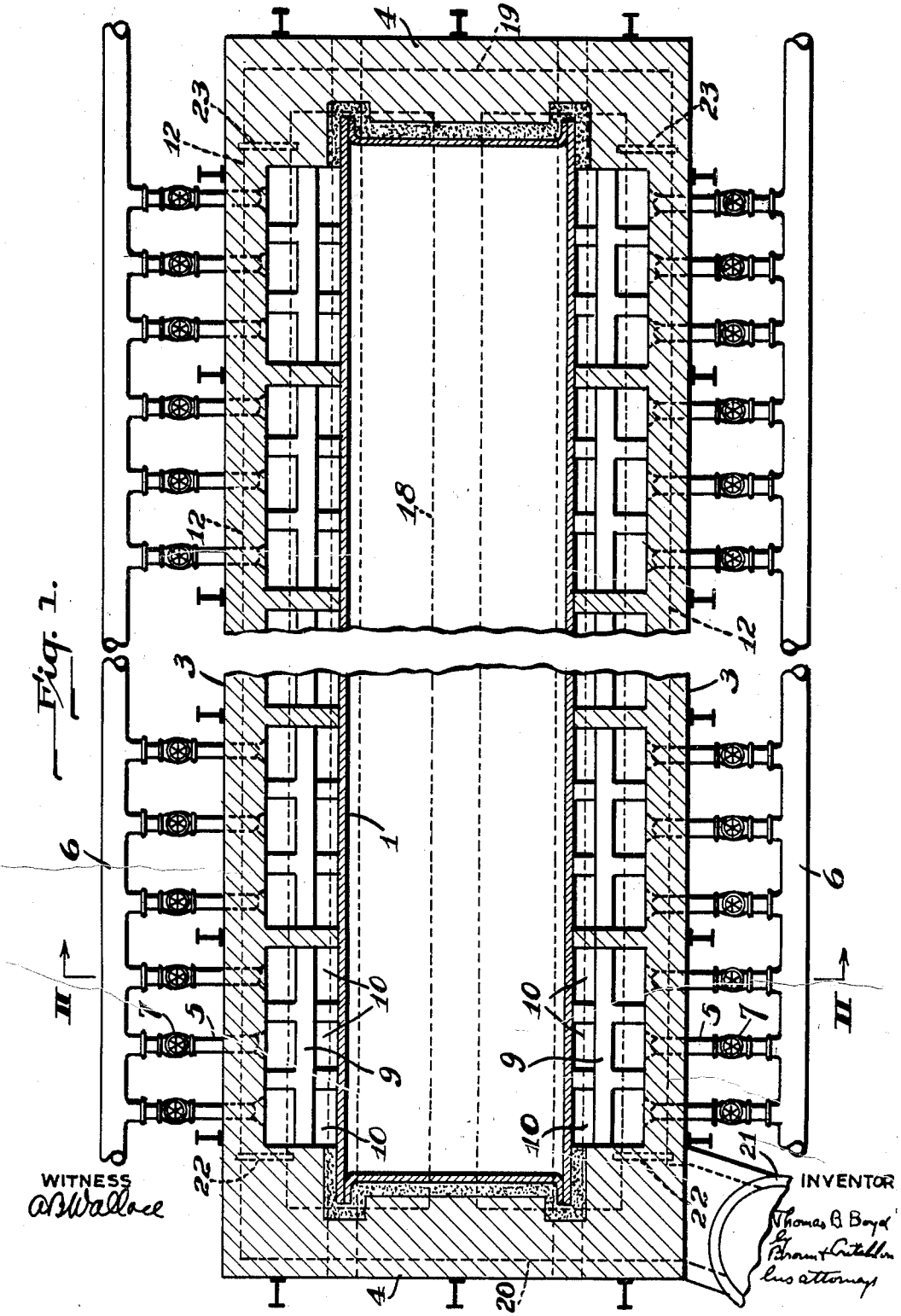

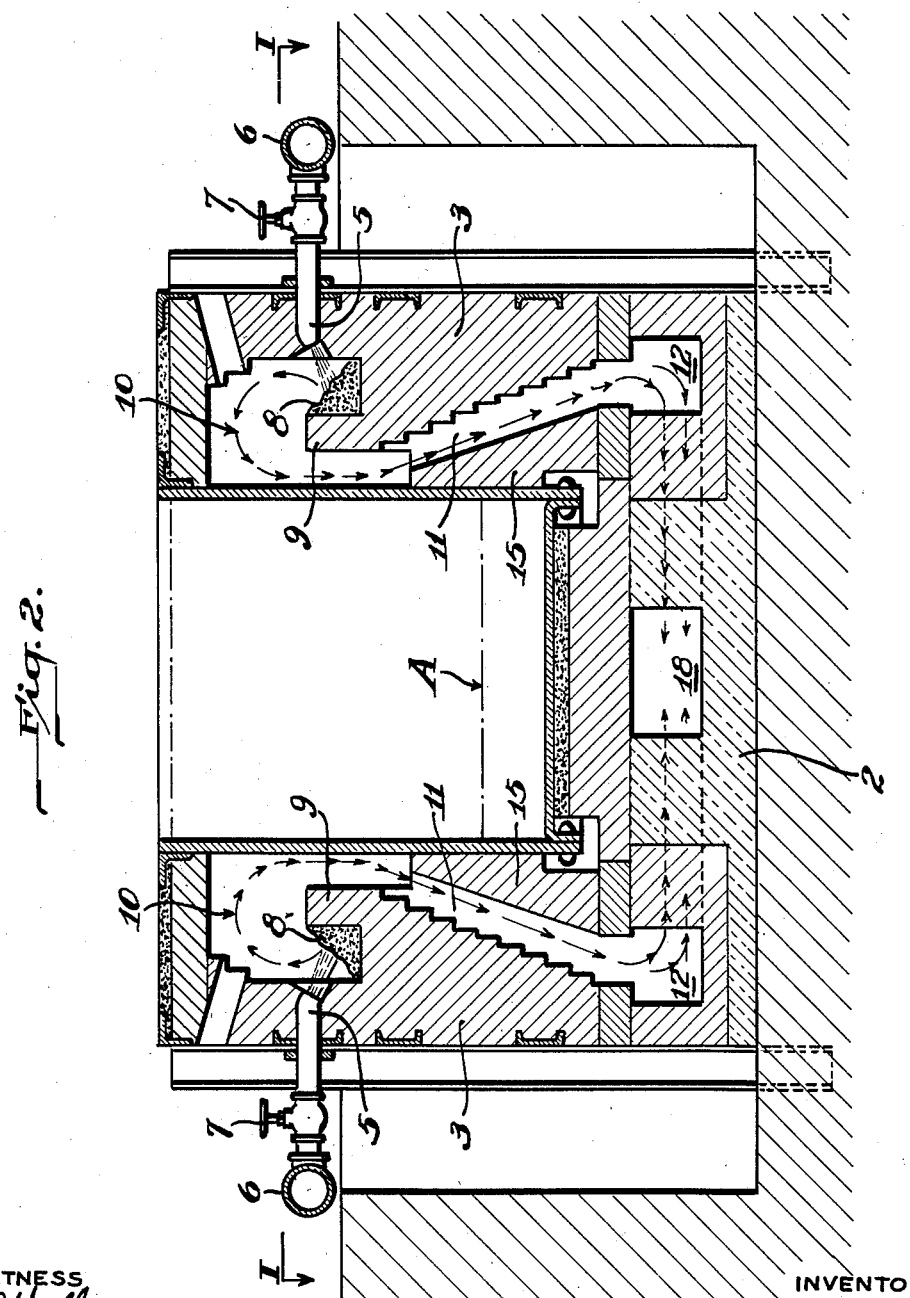

1,866,795

UNITED STATES PATENT OFFICE

THOMAS B. BOYD, OF BUTLER, PENNSYLVANIA

METAL COATING FURNACE

Application filed June 30, 1931. Serial No. 547,886.

The invention relates to furnaces for coating various articles with molten metal. Although in its broader aspects the invention is not limited to furnaces for coating any particular metal, it is especially applicable to furnaces for galvanizing tubes and like articles, and is herein so illustrated and described.

In the construction of galvanizing furnaces of the type explained, the prevailing practice is to so position the fuel burners, or other heating means, that greater heat is applied to the bottom than to the top portions of the spelter-containing tanks. This has resulted in excessive consumption of fuel, because it requires the application of an excessive amount of heat to the bottom of a tank to restore that lost from the top by radiation, and by absorption both by the articles being coated and by the spelter added to the bath.

Furthermore, in galvanizing tanks there is always an accumulation of dross which tends to settle in the bottom portion of the tank, but which does not do so when the metal in the bottom portion of a tank is heated above about 840° F. Accordingly, the application of excessive heat to the bottom of a tank keeps the dross suspended in the upper portion of the molten metal, and, to the extent that dross is present in such metal, the coatings of articles dipped in the metal are impaired.

The object of the invention is to provide a metal coating furnace in which heat is so applied to a metal-containing tank as to effect a substantial saving in fuel, and as to permit the continued settling of dross to the bottom portion of the metal in the tank.

In the accompanying drawings, Fig. 1 is a horizontal sectional view of a metal coating furnace embodying the invention, the plane of view being indicated by the line I—I, Fig. 2; and Fig. 2 a transverse sectional view of the furnace taken on the line II—II of Fig. 1.

The furnace provided according to this invention comprises a metal-containing tank having its bottom and its sides and ends encased in refractory walls made of any suitable material. Extending into vertical walls surrounding the tank there are a plurality of burners near the top of the tank, and in the bottom portions of these walls there are flues extending to a stack. Between the burners and these flues there are vertical downwardly-extending passages, the upper portions of which are adjacent to, and the lower portions of which recede from, the walls of the tank to apply greater heat to the upper than to the lower strata of metal in the tank. Preferably these passages are of increasing cross sectional area downwardly so that greater heat is absorbed from the products of combustion by reason of their increased velocity of flow adjacent to the upper portions of the tank. Adjacent to the burners, and in contact with the upper portion of the tank there are combustion chambers communicating with the downwardly-extending passages, provision being made for so baffling the burners that flames from them do not directly impinge upon the tank.

Having reference now to the illustrative embodiment of the invention, an elongate metal-containing tank 1 is set upon a horizontal bed or foundation 2 of refractory material, and is surrounded by vertical side walls 3 and end walls 4, also formed of refractory material. Extending into each side wall there are a plurality of fuel burners 5, the type or construction of which depends upon the the kind of fuel being used, whether it be gaseous, liquid or pulverized. The burners may be connected to fuel supply conduits 6, and may be individually controlled by valves 7. They are so positioned in the walls that the fuel flames are directed upon beds 8 of refractory material arranged in pockets formed by the refractory walls and baffles 9 which prevent the flames from directly impinging upon the tank. Above the burners there are combustion chambers 10 formed in the refractory walls, one side of the chamber being preferably formed directly by the upper portion of tank 1.

From the combustion chambers, products of combustion flow downwardly through vertical passages 11 to stack flues 12 arranged in the bottom portions of side walls 3. As shown, the upper portions of these passages are so formed that the products of combustion flow in direct contact with the sides of the tank. The lower portions of the passages gradually recede from the sides of the tank, being separated therefrom by refractory barriers 15 of less width at their tops than at their bottoms. As is also shown, the lower portions of passages 11 are of increasing cross sectional area. By positioning the burners, and the combustion chambers communicating with them, adjacent to the upper portion of the tank, and by carrying the products of combustion downwardly in contact first with the upper portion of the tank and then receding from its lower portion, the maximum heat is applied to the strata of metal in the upper portion in the tank, and the strata of metal in the lower portion of the tank may be maintained at a temperature not higher than about 840° F., at which the dross in the molten metal will settle to the bottom of the tank.

In addition to stack flues 12 in the bottom portions of side walls 3, a stack flue 18 is provided in base 2 beneath the bottom of the tank. At the right end of the furnace, as viewed in Fig. 1, flues 12 communicate with a flue 19 in the bottom portion of end wall 4, and at the left end of the furnace each of the flues 12 and 18 communicate with a header 20 extending to a stack 21. The ends of flues 12 may be controlled by dampers 22 and 23 so that products of combustion may be carried to end flue 20 either directly through the flues 12, or indirectly through central flue 18. In the former case each of dampers 23 are closed and dampers 22 open, while in the latter dampers 23 are open and dampers 22 closed. By thus controlling the flow of products of combustion the heating of the bottom portion of the tank may be varied and controlled.

In the actual operation of a pipe galvanizing furnace constructed as herein shown, it has been found that about half as much fuel is required as is necessary to operate a similar furnace having greater heat applied to its lower than to its upper portion. It has also been found that in the operation of my improved furnace the upper strata of molten metal in the tank may be continuously maintained at a proper coating temperature, and the lower strata continuously maintained at such lower temperature as to permit the dross to settle to the bottom of the tank.

According to the provisions of the patent statutes, I have explained the principle and mode of operation of my invention and have illustrated and described what I now consider to represent its best embodiment. However, I desire to have it understood that within the scope of the appended claims the invention may be practiced otherwise than as specifically illustrated and described.

I claim:

1. A metal coating furnace, comprising a tank encased in refractory walls, a plurality of fuel burners in said walls near the top of the tank, stack flues in the bottom portions of said walls, and vertical passages for products of combustion extending downwardly from said burners to said flues, the upper portion of said passages being adjacent to and the lower portions receding from the sides of the tank to apply greater heat to the upper than to the lower strata of metal in the tank.

2. A metal coating furnace, comprising a tank encased in refractory walls, a plurality of fuel burners in said walls near the top of the tank, stack flues in the bottom portions of said walls, and vertical passages of increasing cross sectional area extending downwardly from said burners to said flues, the upper portions of said passages being adjacent to and the lower portions receding from the sides of the tank to apply greater heat to the upper than to the lower strata of metal in the tank.

3. A metal coating furnace, comprising a tank encased in refractory walls, a plurality of burners in said walls near the top of the tank and baffled from the sides thereof, combustion chambers in said walls above said burners and in contact with the upper portion of said tank, stack flues in the bottom portions of said walls, and vertical passages for products of combustion extending downwardly from said combustion chambers to said flues, the upper portions of said passages being adjacent to and the lower portions receding from the sides of the tank to apply greater heat to the upper than to the lower strata of metal in the tank.

4. A metal coating furnace, comprising a tank encased in refractory walls, a plurality of fuel burners near said walls in the top of the tank, stack flues at the sides of the tank below the plane of the bottom thereof, a central stack flue beneath the tank, vertical passages for products of combustion extending downwardly from said burners to said side flues, end flues communicating with said side and central flues, and valves in some of said flues for controlling the removal of products of combustion from the lower end of said passages either directly through said side flues or indirectly through said central flue.

In testimony whereof, I sign my name.

THOMAS B. BOYD.